April 13, 1937. T. W. HOLT ET AL 2,076,643
VENEERED TUBING AND METHOD OF MAKING THE SAME
Filed May 1, 1935
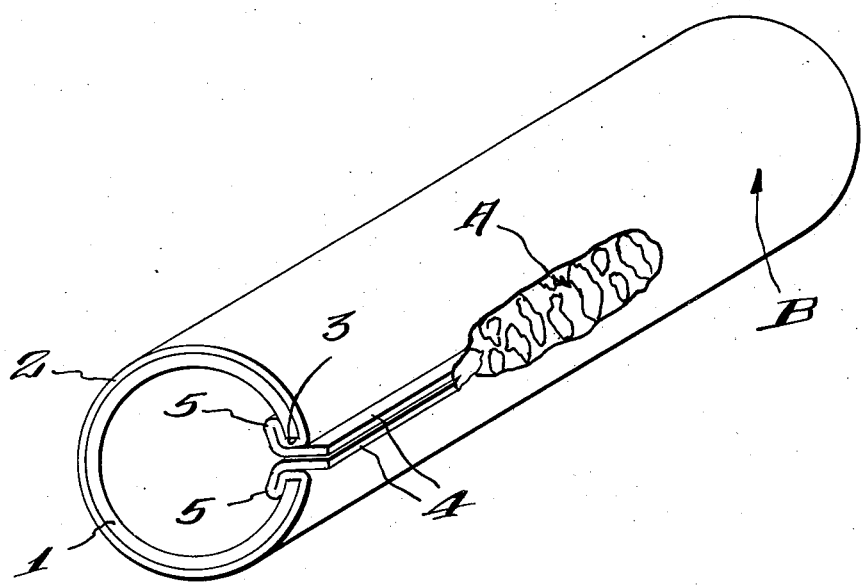
Fig-1-
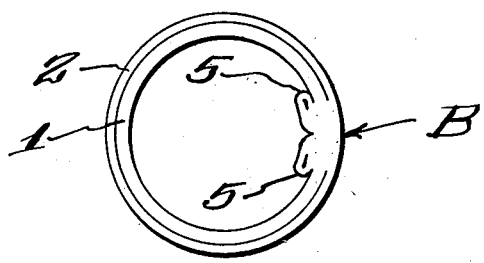
Fig-2-
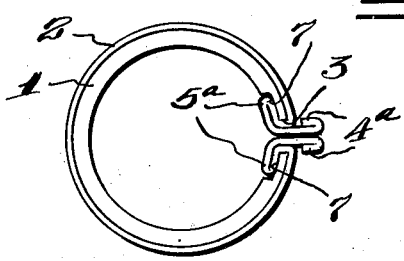
Fig-3-
INVENTORS
Thomas W. Holt + John F. Lavan
BY
Bindell + Thompson
ATTORNEYS.

Patented Apr. 13, 1937

2,076,643

UNITED STATES PATENT OFFICE 2,076,643

VENEERED TUBING AND METHOD OF MAKING THE SAME

Thomas W. Holt and John F. Levan, Elkhart, Ind., assignors to Excel Curtain Company, Elkhart, Ind., a corporation of Delaware Application May 1, 1935, Serial No. 19,267

6 Claims. (Cl. 29—188)

This invention has for its object, a tube to be used primarily for rails, hand holds, uprights, or posts, in situations where a non-corrosive, or non-rustable, tube with a polished outer surface is desirable, which tube is especially economical in construction, seamless in appearance, and made of the body, or base, of relatively cheap metal, and an outer veneer of non-corrosive, or rust-proof, metal, as stainless steel which will keep a polish, or luster; and also the method of forming the same.

It further has for its object, a tube composed generally of a base strip so formed that a slit extends lengthwise thereof, and a veneer strip, the margins of which are so extended into the slit of the split tube formation that the veneer and the tube can be welded together without adding additional metal, or material, for the welding operation, thus effecting considerable saving in material and time due to increase in the welding rate, all tending to reduce the cost of production.

More specifically, it has for its object a tubing in which the veneer strip, or the margins thereof, are folded around the edges of the split base into the interior, and doubled back through the slit to the outside of the tube with the margins projecting through the slit to the outside of the tubing, the margins being preferably interlocked on the interior of the base with the edges of the base. Other objects will appear throughout the specification.

The invention consists in the novel features and in the combinations and constructions hereinafter set forth and claimed.

In describing this invention, reference is had to the accompanying drawing in which like characters designate corresponding parts in all the views.

Figure 1 is an isometric view of a piece of tubing embodying this invention, one end portion showing the construction before welding, the intermediate portion after welding, and the other end portion the finished tube.

Figure 2 is an end view of the finished tubing.

Figure 3 is an end view showing the base which is formed with rabbets in its margins into which the margins of the veneer strip are rolled; this figure also showing the veneer strip, or the portions projecting outside of the tube, as folded flat on themselves to give sufficient metal for welding without projecting the margins too far out of the tube.

The tubing consists of a base, or body, of comparatively cheap metal, as sheet steel, formed to have a slit extending lengthwise thereof, and a veneer, or polishable, non-corrosive, or non-rustable, material having its margins folded through the slit and back out through the slit and integrally united, or welded, the folded end margins preferably interlocking in the tube with the margins of the base adjacent the slit.

The method consists in applying a veneer strip to the outer surface of the base, folding the margins inwardly around the edges of the base at the split, and then reversely out through the slit to the outside of the tube, welding the same together and to the margins without the addition of welding material, and finally polishing so that the tube has a seamless appearance, and is to all intents and purposes a seamless, stainless, steel tube. The veneer material is first folded around the edges of the base blank, or strip, then both formed, or rolled, into tubular form with the margin of the veneer strip folded back to project through the slit in the base strip when rolled to tubular form.

The base may be formed in any suitable manner, and may be of any desirable hollow contour, it being here shown as circular in cross section. It is usually rolled from a flat blank strip with the opposite side edges of the blank confronting each other forming the slit. The veneer strip may be rolled up from a blank and applied to the base blank in any suitable manner, or by tools forming no part of this invention.

I designates the base of sheet metal, or sheet steel; 2 the outer layer of metal capable of being polished, or finished, as stainless steel. The side margins of the veneer strip are folded around the edges of the base, at the slit 3, then reversely outward through the slit to project more or less to the outside of the tube at 4 providing metal for welding without additional metal for that purpose. The amount of the projection of the margins of the veneer outside of the tube is varied to suit welding conditions. Preferably, the margins of the veneer strip are folded, as at 5, around on the inside surfaces of the base tube I adjacent the slit 3 before being folded upon themselves back through the slit 3, thus interlocking the margins with the base 2. The portions, at 4, of the margins of the veneer strip, which portions project through the slit 3 to the outside of the tube, are then integrally united to themselves and to the margins of the base. This is preferably done by electro-welding. After the welding operation, the tube takes somewhat the rough appearance shown at A, Figure 1. The tube is then polished, taking the appearance of a one-piece, seamless, polished tube shown at B, Figure 1.

As seen in Figure 3, the base strip may be formed with rabbets 7 in the margins thereof in which the stainless steel at 5a is folded, so as to have the inner side of the tube at the welded joint flush, or nearly flush, with the remainder of the inner surface of the tube, and so the projections 4a of the veneer blank may be folded flatwise on themselves to give sufficient metal for welding without projecting the margins of the veneer strip so far out of the veneer strip as to retard the electro-welding operation.

The tube may be formed in any suitable manner by rolling the flat base blank and veneer strip into tubular form, and at the same time rolling the margin of the veneer strip around the edges of the base blank at 3 and 5, or 5a, then reversely to form the projection 4 or 4a.

These tubes are particularly cheap and economical to manufacture, and fill all the requirements of polished tubes of comparatively expensive metal, and plated tubes where tubes of this character are required, as for instance, for hand rails, grab handles, posts, etc., such as are used in motor busses, and in other situations where a high class, polished rail, bars, or posts, are desired.

What we claim is:

1. A tube construction comprising a body, or base, formed with a slit extending lengthwise thereof, a veneer strip enclosing the base and having its margin extended around the edges of the base at the slit into the interior of the base and then reversely outwardly through the slit and integrally united to each other and to the margins of the base.

2. A tube construction comprising a body, or base, formed with a slit extending lengthwise thereof, a veneer strip enclosing the base and having its margin extended around the edges of the base at the slit into the interior of the base and laterally along the inner faces of the margins of the base at the slit to interlock therewith, then reversely and outwardly through the slit and integrally united to each other and to the margins of the base.

3. The method of forming tubes of the class described, consisting in applying a veneer of stainless steel to a metal base, folding the margins of the veneer around the edges of the base and then reversely outward so that the margins of the veneer extend into the interior of the tubular formation when the base and veneer are formed into a tube, and also extend through the slit, left after rolling to tubular form, to the outside of the tube, thereby providing welding metal without the addition of other welding metal, welding said margins together and to the adjacent portions of the veneer strip and the base, and finally smoothing and polishing off the welded area.

4. A tube construction comprising a body, or base, formed with a slit extending lengthwise thereof, a veneer strip enclosing the base and having its margin extended around the edges of the base at the slit into the interior of the base and laterally along the inner faces of the margins of the base at the slit to interlock therewith, then reversely and outwardly through the slit and integrally united to each other and to the margins of the base, the base being formed with rabbets in the margins adjacent the slit, which rabbets are located on the inner side of the base, and portions of the veneer strip being located in said rabbets.

5. A tube construction comprising a body or base formed with a slit extending lengthwise thereof and having rabbets on the inner face of the margin thereof adjacent the slit, and a veneer strip enclosing the base and having its margin extending around the edges of the base at the slit and into the rabbets and integrally united to themselves and to the margins of the base strip.

6. The method of forming tubes of the class described consisting of applying a veneer of stainless steel to a metal base formed with marginal rabbets extending lengthwise thereof, folding the margins of the veneer strip around the edges of the base and into the rabbets, forming the base with the veneer strip applied into tubular form with the rabbeted edges of the strip and the margins of the veneer folded around said edges, confronting each other, welding said margins together and to the adjacent portions of the veneer strip and finally smoothing and polishing the welded area.

THOMAS W. HOLT.
JOHN F. LEVAN.